Oct. 2, 1945. H. E. PANCHER 2,386,138
MOTOR ROTOR AND METHOD OF MAKING THE SAME
Filed Jan. 5, 1942   2 Sheets-Sheet 1

Inventor
H. E. Pancher
By
Pattison, Wright & Pattison
Attorneys

Oct. 2, 1945.  H. E. PANCHER  2,386,138
MOTOR ROTOR AND METHOD OF MAKING THE SAME
Filed Jan. 5, 1942  2 Sheets-Sheet 2
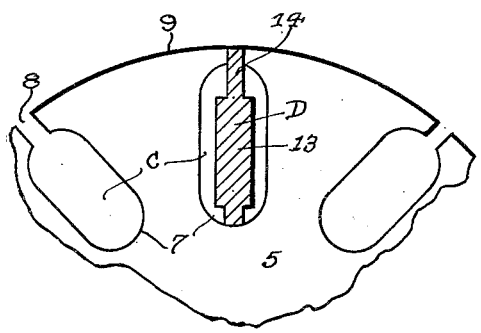
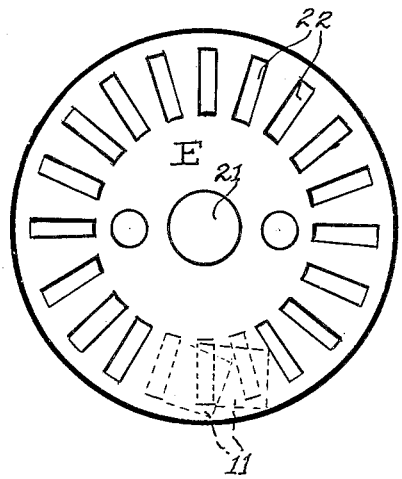
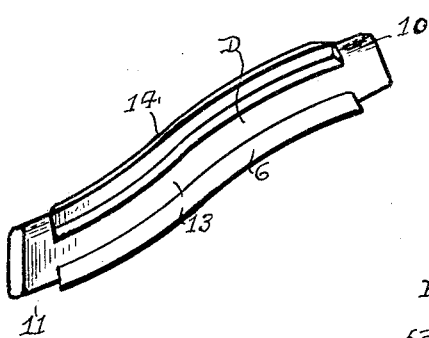
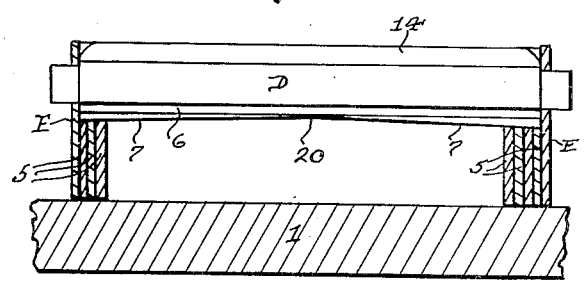
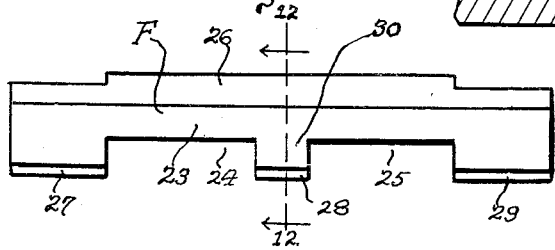
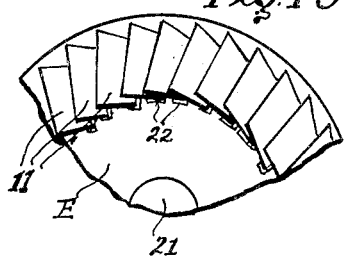
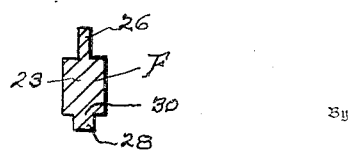
Inventor
H. E. Pancher
Pattison, Wright & Pattison
Attorneys

UNITED STATES PATENT OFFICE 2,386,138

MOTOR ROTOR AND METHOD OF MAKING THE SAME

Harry Edward Pancher, Owosso, Mich., assignor to A. G. Redmond Co., Owosso, Mich., a corporation of Michigan Application January 5, 1942, Serial No. 425,668

12 Claims. (Cl. 172—120)

This invention pertains broadly to an improved electric motor rotor and the method of making the same but pertains more specifically and particularly to a rotor having therein a plurality of inductor bars which extend longitudinally of the rotor and are disposed at an angle to the longitudinal axis of the rotor, such as for instance a rotor for a shaded pole induction motor.

One of the primary objects of the invention is to simplify and cheapen the manufacture of the rotor.

Another object of the invention is to provide not only an improved rotor but a rotor which will produce an improved motor in that the motors having incorporated in them a rotor of my construction will have more uniform performance and be free from magnetic hum.

In the accomplishment of the foregoing objects and advantages other specific advantages are obtained such as definite assurance of the maintenance of the proper angle or disposition of the inductor bars; material if not complete elimination of the rejection of rotors due to imperfection in manufacture or in performance; and the elimination of certain manufacturing steps heretofore necessary in the production of rotors as well as other objects which will appear from the following specific description.

Accomplishment of the foregoing objects and advantages have resulted in the creation of a new and improved method in the manufacture of rotors as well as the creation of inductor bars having a novel and improved construction.

In the accompanying drawings which illustrate an embodiment of the present invention and a rotor built in accord with the present improved method:

Fig. 6 is a view similar to Fig. 5 after the rotor has been subjected to a machining operation.

Fig. 7 is a detail perspective view of one of the inductor bars.

Fig. 8 is a plan view of one of the end plates of the rotor, the bent-over ends of several inductor bars being shown in dotted lines.

Fig. 9 is a vertical sectional view through the rotor with the end plates in place prior to securing the end plates and protruding ends of the inductor bars together.

Fig. 10 is a fragmentary plan view of the end of the rotor illustrating the manner of bending the ends of the inductor bars.

Fig. 11 is a side view of a modified form of inductor bar.

Fig. 12 is a vertical sectional view taken on the line 12—12 of Fig. 11.

Figure 1:
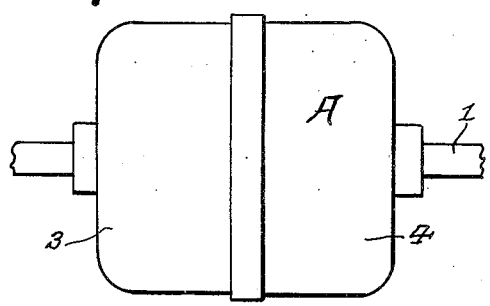
Fig. 1 is a side plan view of an electric motor.

To a complete understanding of the advantages and benefits attendant to my improved motor rotor and the method of making the same, a short discussion and description of a conventional rotor and the method of making the same is necessary.

The conventional or ordinary rotor commonly found in electric motors comprises a shaft which is knurled or roughened intermediate its ends and for a distance along the shaft equal or substantially equal to the length of the desired rotor. The rotor itself is laminated and the metal plates of which it is composed are circular in form and provided with a passageway of the proper shape to permit the passage therethrough of the rotor shaft and of the proper dimension to require a force fit with the knurled portion of the shaft so that the plates are held against axial rotation on the shaft through frictional engagement with the knurled portion of the shaft.

In spaced relationship throughout their circumferences the plates are provided with openings having a closed bottom, and an open top which is of reduced size and extends to and terminates at the peripheral edge of the plates. These openings are for the reception of the inductor bars of the rotor which bars are composed of metal and are of a length greater than the length of the rotor so as to protrude or extend beyond the rotor at both ends thereof.

In mounting or positioning the plates constituting the rotor proper on the shaft the inductor openings are aligned in a manner to properly receive the inductor bars which instead of being straight throughout their lengths are twisted which twist or skew is of material importance in producing motors which will have uniform performance and will not have in them magnetic hum. Consequently the maintenance of the angle of the skew of the inductor bars is of prime importance.

From the foregoing it will be understood that although the inductor bars extend in a direction longitudinal the axis of the rotor and the rotor shaft the inductor bars do not parallel the shaft by reason of their being twisted.

For the purpose of obtaining different performance characteristics the size, and by size I have reference to thickness, of the inductor bars are different with the result that while in some rotors the inductor bars may practically fill the inductor openings or slots in the rotor plates in other instances where the size of the bars is reduced they fit quite loosely in the slots.

It will be obvious that where the inductor bars fit loosely in their slots they cannot lock or hold the rotor plates against axial rotation on the rotor shaft. The only means tending to prevent rotation of the plates on the shaft is their frictional engagement with the roughened or knurled portion of the shaft, and I have found that this frictional engagement between the shaft and the plates is not sufficient to maintain the rotor plates against axial rotation when the rotor is subjected to those operations which it must undergo to become a completed and finished rotor. Should the plates rotate axially the angle of the skew of the inductor bars is not maintained and therefore uniformity of performance of the motor is destroyed and the motors have in them a magnetic hum.

When an assembly has been made of the rotor plates on the shaft with the inductor bars extending through the plate slots the rotor must be subjected to a machining operation. It is the face or outer surface of the rotor which is machined and it is during this machining operation that the plates are subjected to a strain which causes them to rotate on the shaft in respect to one another and thus destroy the angle of the skew, that is the proper angle of the inductor bars.

Furthermore it has been usual practice to provide rotors which have at their outer face or surface a gap or groove which extends from edge to edge of the rotor. This gap or groove is occasioned by the reduced open tops of the plate inductor slots by reason of the fact that no portion of the inductor bars are disposed within the opening at the top of the slots.

I have found that this opening or groove interferes materially with the production process incident to the manufacture of rotors for the reason that when the rotor is subjected to the hereinbefore described machining operation metal shavings as well as other material from the body of the rotor are turned over and down into this opening or groove. By reason of the foregoing it has been necessary in the past to reject many rotors due to irregularities in the groove and by reason of shavings or chips being present in the grooves and which when present have a tendency to be drawn out of the grooves by the magnetism generated in the stator when the motor was running. I have found that due to the presence of irregularities or foreign matter in the grooves motors have been noisy and there has not been uniformity of performance.

It will be obvious that the preceding described deficiencies and objections would not only result in an increase of the cost of production but would likewise result in the production in many instances of noisy motors and motors which are not uniform of performance.

In the past it has not been unusual practice after the rotor had been machined to subject it to a varnishing operation to seal the grooves in its face so as to prevent the metal shavings, chips or other foreign matter from being drawn out from the grooves. This practice has not been found altogether satisfactory and has been discontinued and when used constituted a step which increased the cost and reduced the speed of production.

It has been mentioned that the inductor bars protrude and it has been common practice to melt or fuse down the extending portions of the inductor bars upon or over the ends of the rotor.

Having the foregoing deficiencies of rotors as now made as well as the difficulty of manufacturing them in mind and desiring to overcome the same I have conceived an improved rotor and the method of making the same, a specific description of which is as follows.

Having reference to the accompanying drawings and utilizing similar reference characters and numerals to designate like parts throughout the description, I designates the rotor shaft which throughout a portion of its length is roughened or knurled as at 2.

The motor as an entirety is designated by A and appears in Fig. 1 of the drawings. As is conventional the motor comprises a two-piece housing the parts of which are designated as 3 and 4 and within which the parts making up the motor are disposed on and about the motor shaft I which passes completely through the housing.

Figure 2:
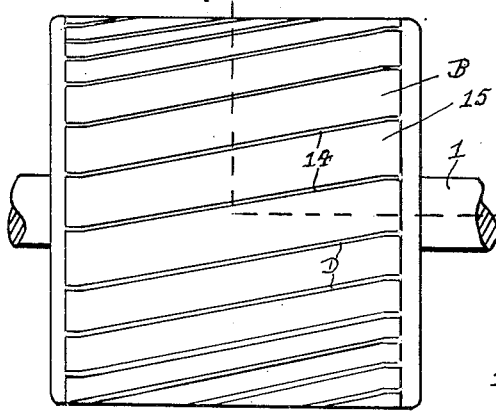
Fig. 2 is a side or plan view of the improved rotor.

The rotor as an entirety in its finished form is illustrated in Fig. 2 and designated as an entirety by B.

Figure 3:
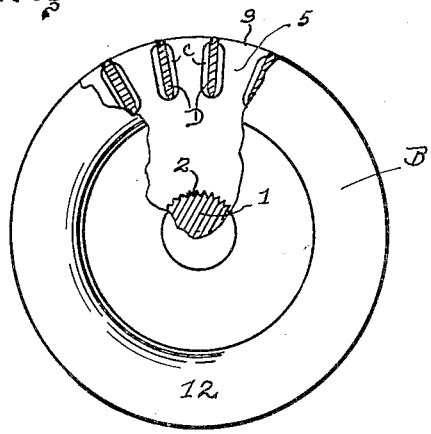
Fig. 3 is an end view of the rotor partly in vertical section on a line between two of the rotor plates as is intended to be indicated by the section line 3—3 of Fig. 2 of the drawings.

The rotor is laminated and made up of a plurality of metal plates 5 each of which is provided centrally with an opening for the passage of the rotor shaft and for frictional engagement, as illustrated in Fig. 3 of the drawings, with the knurled or roughened portion 2 of the shaft. These plates are arranged in face to face abutting relationship on the shaft and the number of plates used is of course determined by the desired length of the rotor just as the diameter of the plates is determined by the desired diameter of the rotor.

Each of the rotor plates in spaced relation around its circumference is provided with a plurality of inductor bar slots C each having a closed rounded bottom 7 and an open top 8 the size of which is materially reduced as respects the transverse size of the slot. By reference particularly to Fig. 5 of the drawings it will be seen that the open top or opening at the top of the inductor bar slot extends all the way to and through the peripheral edge 9 of the rotor plate.

Figure 5:
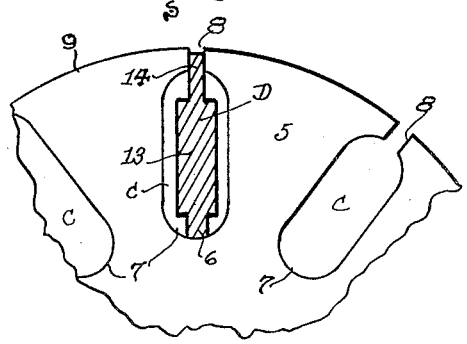
Fig. 5 is a fragmentary detail view of several of the inductor bar slots in a rotor plate with an inductor bar illustrated in vertical sectional view, the view indicating the condition of these parts prior to the machining operation.

The inductor bars, which are composed of copper or other suitable metal, are designated as an entirety by D and their configuration can be clearly determined by reference to Fig. 7 of the drawings in conjunction with Fig. 5 of the drawings wherein an inductor bar appears in vertical cross section.

Figure 4:
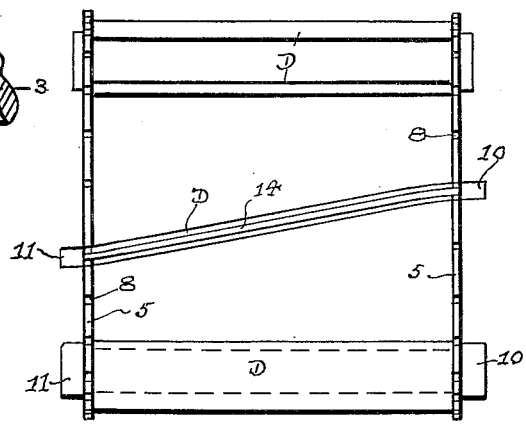
Fig. 4 is a diagrammatic plan or side view illustrating the manner of mounting the inductor bars in the rotor plates, only the end rotor plate being illustrated for the purpose of clearer understanding.

Fig. 4 of the drawing is diagrammatic in nature and is included for the purpose of more clearly illustrating the invention and to that end only the two outer rotor plates making up the rotor are illustrated. From this particular figure it will be seen that the inductor bars are longer than the rotor and that their full sized end portions 10 and 11 extend outwardly beyond each end of the rotor. These extending portions 10 and 11 of the inductor bar, in the finished rotor, are fused or melted down over the end of the rotor as indicated at 12 in Fig. 3 of the drawings.

Each inductor bar has a main portion 13 which is disposed within the inductor slots C of the plates and at its top is provided with an extending fin 14 of reduced thickness. This fin is of a thickness to freely enter the opening or open top 8 of the plate slot C but sufficient thickness is maintained in the fin to prevent any appreciable looseness between the fin and the opening.

As a result of this construction it will be seen that irrespective of the nature of the fit between the main inductor bar portion 13 and the plate slot C these fins lock the plates together so that they can only rotate on the shaft as a unit. This means that the benefit of the holding power of all of the plates against rotation on the shaft is utilized as against the holding power of the individual plates, as is the case in the prior art practice heretofore specifically described. Furthermore and very important it means that even should the plates rotate axially on the shaft they will rotate as a unit and thus not alter nor destroy the angle of the skew or the angle of the inductor bars.

With this construction it is possible with the same rotor plates to assemble rotors having inductors of varying sizes as respects the thickness or configuration of the main inductor bar portion 13. It remains necessary only to maintain an inductor bar fin of the proper size to fit snugly within the open tops of the inductor plate slots C.

The inductor bars at their lower edges are of reduced thickness to provide a fin 6. This fin like the aforementioned fin 14 has its side walls equally placed from the side walls of the main thickened portion 13 of the bar, that is to say, the fins extend outwardly from the center of the bar in respect to its thickness.

The fin 6 has a definite purpose which is that of engaging the rounded bottoms 7 of the plates 5 to support the inductor bars so that the fins at their upper edges are in the slot openings 8. Should the full width 13 of the inductor bars be allowed to engage the rounded bottoms 7 of the slots C they would engage well on the radius of these rounded bottoms and this would vary the position of the inductor bars too greatly by reason of the fact that the opening provided by the plurality of slots C is of reduced size by reason of the skew-like extension of the opening caused by the plates 5 having their openings C staggered in respect to one another as they must be to accommodate the bent or curved inductor bars. In other words, the openings provided through the rotor by the slots C of the plates are curved from one end to the other which results in the inductor bars resting on the bottoms 7 of the plates only at the center of the rotor as is illustrated at 20 in Fig. 9 of the drawings.

The result of the foregoing is that with the inductor bars contacting the bottoms of the plate slots only at the center of the rotor these bars will not, unless secured at their ends, remain parallel with the rotor axis but would tend to tilt so as to be high at one end and low at the other.

To prevent tilting of the inductor bars an end plate E is positioned at each end of the rotor and they, like the plates 5, are provided with a central opening 21 to receive the motor shaft 1. These plates have a plurality of rectangular openings 22 which equal in number the number of inductor bars and which are of a size to snugly receive the extending end portions 10 and 11 of the inductor bars. This construction has a decided advantage over endeavoring to build a motor without end rings. These end rings are of copper and therefore it is possible to obtain a much better connection of the fused ends of the inductor bars through these copper end plates than would be the case were they omitted because when the ends of the inductors are fused or welded the copper end rings provide material for the fused ends of the inductors to flow into and produce a uniform welded end connection. If the ends of the inductor bars are soldered the rings provide a better soldering connection.

When a low resistance end connection is desired several end rings can be used at each end of the rotor.

Additionally these end rings are most important in simplifying the assembly of the motors and this will be apparent from the foregoing remarks pointing out that the openings of the end rings are such as to snugly receive the extending ends of the inductor bars so as to support the bars horizontal to the motor shaft and prevent their tilting with the point 20 as a fulcrum as would occur in assembly were the end plates omitted.

To further assure during assembly the proper positioning of the inductor bars they can be further secured in proper position, if desired, by bending their protruding ends down in a direction opposite to the direction of skew as is illustrated in Fig. 10 of the drawings. Bending of the protruding ends of the inductor bars results in clamping the rotor laminations tighter and assuring the proper positioning of the inductor bars until their ends are fused, welded or soldered to the end plates as they are in the final finished rotor, as is illustrated in Fig. 3 of the drawings.

Maintenance of the inductors in their proper positions parallel with the rotor axis is of the utmost importance in the production of quiet motors.

The production of rotors of different lengths can be simply accomplished by the mere provision of more plates 5 and longer inductor bars. In respect to all rotors the inductor fins will be of a length the same as the length of the stack of abutted plates 5 so that the only protruding parts of the inductors are their full-sized ends 10 and 11.

With the plates assembled on the shaft and the inductor bars secured in place the machining operation of the rotor can be safely undertaken and in Figs. 5 and 6 of the drawings I have endeavored to illustrate the rotor before and after being subjected to this machining step. It will be seen that in truing the rotor its original diameter is reduced with the result that a portion of the inductor bar fins 14 have been removed. It will be further seen that the face 15 of the rotor is smooth and unbroken by any transversely extending gap or groove which of course is due to the fact that the inductor ribs 14 fill the opening constituting the open top of the plate inductor bar slots.

It will be apparent that the characteristics of the motor can be varied by varying the characteristics of the inductor bars. In Figs. 11 and 12 of the drawings a modified form of inductor bar is illustrated and is the type of bar that can be used to obtain a high resistance rotor. The bar is designated as an entirety at F and has a central thick portion 23 which intermediate its ends is notched out as at 24 and 25 to reduce the effective path through the inductor. At its upper edge the bar is provided with a fin 26 and at its lower edge, with the exception of its notched out portion, it is provided with a fin made in three separated portions 27, 28 and 29. The center section or portion 30 of the bar is provided to support the bar in the rotor slots. It has been pointed out that the bars are supported on the bottom of the plate slots at a point central of the length of the rotor and accordingly it would not do to notch out the bar central of its length because to do so would remove its means of support in the plate slots.

This modified form of rotor can be substituted for the form first described which would not be the case were a bar of small cross section utilized in an effort to provide a high resistance rotor. Additionally a bar of small section would be too thin for practical or safe handling and would weaken the rotor mechanically.

From the foregoing description it will be seen that I have simplified, speeded up and reduced the cost of manufacture of electric motor rotors without in any way sacrificing quality or performance of the rotors, but on the contrary have produced better rotors and as a consequence better motors.

My improved inductor bar also simplifies and cheapens production in that it makes it possible with the same rotor plates to use inductor bars of different size to produce rotors having different performance characteristics. In other words without in any way altering the construction of the laminated rotor different inductor bars can be utilized in combination therewith to produce motors which will have different performance characteristics.

The principle of the invention can be utilized and the improved results of the invention can be obtained without following in specific detail the construction illustrated in the accompanying drawings and consequently the invention is to be limited only within the scope of the hereinafter appended claims.

In the event the end plates were eliminated the melted or fused down ends of the inductor bars could be utilized as a substitute therefor to provide in the finished motor conductor plates at the ends of the rotor. Such a construction is not however considered as desirable not only from the standpoint of the finished motor but also from the standpoint of simplifying assembly as is the construction wherein end plates are used, because there would then be no means provided for assuring that the inductor bars are retained in their proper positions during the machining operation to which the rotor must be subjected.

When end plates are used there can be no longitudinal movement whatsoever of the inductor bars because the inductor bar openings in the end plates are not sufficiently long to permit the passage of the finned upper or lower edges of the bars.

I realize that in the past inductor bars have been cast integral with a rotor and having edges flush with the side and end faces of the rotor, but those constructions are entirely different from my rotor made by assembling the inductor bars therein.

I claim:

1. The combination comprising, an electric motor rotor and improved inductor bars therefor, said rotor being of laminated construction and composed of a plurality of plates each provided with a plurality of slots for the reception of a plurality of inductor bars, said plate slots provided with reduced outer open ends, inductor bars disposed within said slots and being of a thickness to be loose in said slots transversely thereof, and said bars having their outer edges reduced in thickness and extending into and snugly fitting the reduced open outer ends of said slots, for the purpose described.

2. The combination comprising, an electric motor rotor and improved inductor bars therefor, said rotor being of laminated construction and composed of a plurality of plates each provided with a plurality of slots for the reception of a plurality of inductor bars, said plate slots provided with reduced outer open ends, inductor bars disposed within said slots and loosely fitting the transverse dimensions of the slots and said bars having their outer edges reduced in thickness and extending into and snugly fitting the reduced open outer ends of said slots, and the tops of the outer edges of said bars terminating flush with the peripheral faces of said plates, whereby said plates can rotate only as a unit, and a rotor having a smooth unbroken side face area is provided.

3. In an electric motor, a rotatable shaft and a rotor thereon, said rotor being of laminated construction and comprising a plurality of plates arranged in face to face abutting relationship, said plates having engagement with said shaft to rotate therewith, a plurality of inductor bars extending through said plates in spaced relationship about the circumference thereof, said inductor bars having a main body portion disposed within said plates and loose for movement therein in a direction transverse the length of bars, and said inductor bars having a fin portion snugly engaging said plates to lock them together as a unit and prevent independent rotation of the plates in respect to one another on said shaft.

4. In an electric motor, a rotatable shaft and a rotor thereon, said rotor being of laminated construction and comprising a plurality of plates arranged in face to face abutting relationship, said plates having engagement with said shaft to rotate therewith, said plates having a plurality of spaced longitudinally extending openings, a plurality of inductor bars extending through said plate openings and arranged in spaced relationship about the circumference of the plates, said inductor bars having a main body portion of less thickness than said plate openings and therefor loosely engaging said plates, said inductor bars having a fin portion snugly engaging said plates to lock them together as a unit and prevent independent rotation of the plates in respect to one another on said shaft, and said inductor bar fins extending to and terminating flush with the outer peripheral faces of said plates to form a portion of a rotor side face area which area is smooth and unbroken throughout its entire extent.

5. In an electric motor, a rotatable shaft and a rotor thereon and rotatable therewith, said rotor comprising a plurality of assembled plates each provided with a plurality of spaced longitudinally extending slots having rounded bottom ends and open outer ends of smaller width than the width of said slots and positioned at and extending to the outer face of the rotor, an individual inductor bar insertable into each of said slots, said bars being of a thickness to be loose in said slots transversely thereof, said inductor bars having a top edge of reduced thickness extending outwardly into the outer open end of the slot and terminating flush with the said face of the rotor, the bottom edges of said inductor bars being of reduced thickness and engaging the rounded bottom of said plate slots and supporting said bars, whereby a rotor having a smooth unbroken side face area is provided.

6. In an electric motor, a rotatable shaft and a rotor thereon, said rotor comprising a plurality of plates arranged in face to face abutting relationship with each plate being rotatable with said shaft, each of said plates being provided with a plurality of slots for the reception of a plurality of inductor bars, said slots providing openings extending from end to end of said rotor with the ends of said slots out of alignment to provide an opening which is curved longitudinally, a plurality of inductor bars extending through said plates in spaced relationship about the circumference thereof, said bars engaging the bottom of said openings provided by said slots only at a point intermediate their ends and approximately mid-way their length, and plates at the opposite ends of said rotor each of which is provided with an opening for the end of each inductor bar with said opening of a size to snugly receive the inductor bar end to position and support the inductor bar so that the upper edge of the bar is in a plane parallel to the longitudinal axis of said rotor shaft.

7. A construction such as defined in claim 6 wherein, the inductor bar ends extend beyond said plates and are bent down upon said plates in a direction transverse the longitudinal axis of the bar and are secured to the outer faces of said plates.

8. For use in an electric motor rotor, an inductor bar having an elongated main body portion, said bar at its top edge being of reduced thickness to provide a longitudinally extending fin, and the bottom edge of said bar having notched out portions intermediate its ends and arranged in separated relationship to provide an uncut-out portion at and adjacent each side of the center vertical axis of said bar.

9. In an electric motor, a rotor provided with a plurality of spaced slots extending from end to end of said rotor, said slots having open tops, said slot top openings being of less width than the remaining portions of the slots, an inductor bar extending through each slot, each bar having a main body portion within the wider portion of its slot and an upper edge portion of reduced thickness which constitutes a fin which fits snugly into the open top of the slot, a plate at each end of the rotor provided with an opening in registry with each slot end, the fin of each bar stopping short of the ends of the bar to provide bar ends having throughout their heights a thickness equal to that of the main body portion of the bars, said bar ends fitting snugly in and extending through said plate openings, and the extending ends of said bars being bent down upon the outer faces of said plates.

10. A construction as defined in claim 9 wherein, the main body portions of the bars have a loose transverse fit with their slots and the engagement between the bar ends and the plate openings prevent the bars from tilting transversely.

11. A construction as defined in claim 9 wherein, the ends of the bars beyond the fins are of less height than the remaining and intermediate portion of the bars, and the ends of said fins constituting shoulders which abut the inner faces of said plates.

12. For use with an electric motor, an inductor bar comprising an elongated metallic member of substantial thickness throughout its length, said bar having an upper edge of reduced thickness providing a fin extending throughout the length of the bar, said bar at its bottom being in the form of a plurality of tooth shaped elements, and the bottom edges of each of said tooth elements being of reduced thickness to provide a fin extending throughout the width of the tooth.

HARRY EDWARD PANCHER.